No. 12,011. Reissued July 15, 1902.

R. W. DICKENSON.

INDEX CABINET.

(Application filed Nov. 8, 1901.)

Witnesses:
A. E. Bergesen
H. L. Strauwald

Inventor:
Richardson W. Dickenson.
by: Styles & Bradbury
Attorneys.

UNITED STATES PATENT OFFICE.

RICHARDSON WILLIAM DICKENSON, OF SIOUX FALLS, SOUTH DAKOTA.

INDEX-CABINET.

SPECIFICATION forming part of Reissued Letters Patent No. 12,011, dated July 15, 1902.

Original No. 681,409, dated August 27, 1901. Application for reissue filed November 8, 1901. Serial No. 81,636.

*To all whom it may concern:*

Be it known that I, RICHARDSON WILLIAM DICKENSON, a citizen of the United States, residing at Sioux Falls, in the county of Minnehaha and State of South Dakota, have invented a new and useful Index-Cabinet, of which the following is a specification.

This invention relates to index-cabinets; and the object of the same is to provide simple and effective means whereby billing-forms are conveniently retained and on which the names of purchasers are entered in alphabetical order, together with the entries of their purchases, at the time of making sale, and whereby the bill of any purchaser may be instantly referred to for making subsequent charges or for summing up and rendering a statement of account.

The invention consists in the construction and arrangement of the several parts, which will be more fully hereinafter described and claimed.

Figure 2:
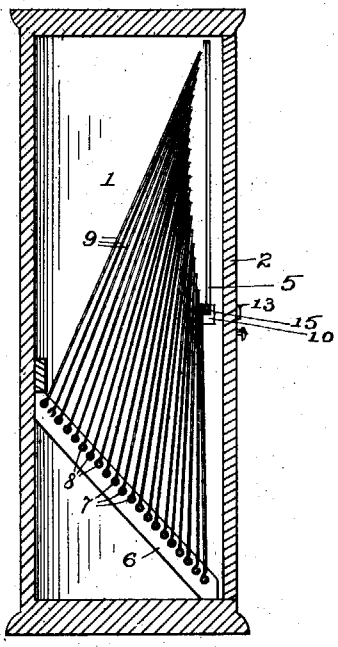
Figure 3:
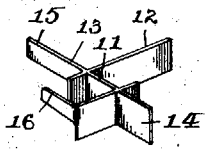
Figure 1:
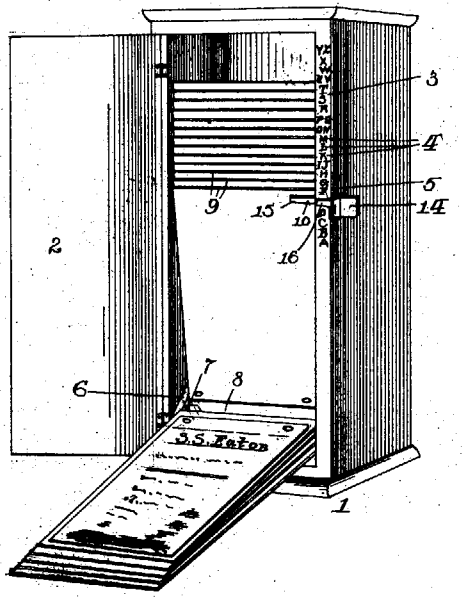

In the drawings, Figure 1 is a perspective view of a cabinet embodying the features of the invention and shown open. Fig. 2 is a transverse vertical section of the cabinet in closed condition. Fig. 3 is a detail perspective view of a combined index and holder.

Similar numerals of reference are employed to indicate corresponding parts in the several views.

The numeral 1 designates a cabinet of any suitable form and material, the dimensions of the same being variable at will and in accordance with the number of carriers mounted in the device and which will be more fully hereinafter explained. The front side of the cabinet is open and may be closed by a door 2, the upper portion of one side edge 3 at the front having letters 4 alphabetically arranged thereon, with the letter "A" at the bottom. In the rear of the said lettered edge the adjacent end of the cabinet is formed with a vertical slot 5 of a length equal to the extent of the letters 4. In the lower portion of the cabinet are supports 6, interiorly disposed close to the ends of the latter, and extending horizontally from one to the other of the said supports are stationary pivot-rods 7, on which are mounted the rolled ends 8 of a plurality of carriers 9, the number of said carriers being equal to the number of the letters or groups of letters 4 on the edge 3. The supports 6 are inclined upward toward the back of the cabinet, and the carriers from the front to the rear one gradually increase in height, and by this means the upper end of each carrier projects above and is clear of the one in front. The carriers are suitably constructed to hold a number of bills or other sheets, those on each carrier being under the names of persons or purchasers who may have a running account with a dealer or merchant, those beginning with the same letter being in the same carrier, and the carriers will also be positioned in the group in accordance with the position of the letters on the edge 3 to which they correspond—that is, the carrier corresponding to the letter "D," for instance, will be the fourth one from the front. By means which will be hereinafter set forth the carriers may be readily let down through the open front side of the cabinet to bring the successive bills under names having different initial letters down into position for additions to the matter thereon or for inspection as to the amount of the same in rendering a statement or the like. When a part of the carriers are let down, as shown in Fig. 1, the remaining portion will be held up in the cabinet, and any one of the carriers may be quickly exposed for inspection of the matter held thereby.

In operative conjunction with the carriers a combined index and holder 10 is employed, preferably constructed of suitable flexible metal and mounted to slide by its own weight in the slot 5. This combined index and holder comprises a member 11, which is intersected by right-angular guide and index strips 12 and 13, which are spaced apart from each other, the portion of the said member between the points of intersection of the said strips therewith being held in the said slot for loose sliding movement in the latter, the said strips inseparably retaining the combined device in the slot 5. The outer end of the member 11 provides a grip 14, and the inner extremity 15 is reduced to form a holder which engages the upper ends of the carriers. The holder when in its lowest position retains all the carriers in the cabinet by engaging the upper end of the front one and when raised to clear the carrier desired likewise holds the carriers remaining in the cabinet in elevated position. The guide-strip 12 is located against the inner side of the end of the cabinet, having the slot 5 therein to serve to steady the combined device in its movement, and the front extremity of the index-strip 13 is bent at a right angle to provide an index-finger 16, which extends across the edge 3 and projects in the same direction as the holder 15 and approximately parallel with the latter and in the same plane, so that when the finger is moved to the position of the desired letter corresponding to the initial letter on the bill to be brought down for inspection the holder 15 will correspondingly move over the upper ends of the carriers to allow the proper one to fall on top of those already liberated in exposed position. When it is desired to close the the carriers into the cabinet after use, those that have been permitted to fall are raised, the combined index and holder being first raised to clear all the carriers and the latter pressed back to let the said combined device fall by gravity to its normal position, which it will do in view of the fact that it works very easily in the slot 5 and is heavy enough to accomplish this operation.

The improved device as an entirety will be found very useful and convenient, and its use will save considerable time in examining and arranging or adding to accounts, which can be kept separate, and avoid running the pages of a blotter or other book to find the state of the same or other information desired.

Having described my invention, what I claim as new, and desire to protect by Letters Patent, is—

1. In a device of the class set forth, the combination of a cabinet open at the front and having a door to close the same, the upper portion of one end of the cabinet near the one front edge being formed with a vertical slot, and said edge having letters thereon adjacent to said slot, a series of carriers movably attached at their lower ends within the lower portion of the cabinet, the upper end of each carrier, except the one in front, when in superior position, extending above that immediately in advance of it, and a combined index and holder slidingly mounted in the said slot.

2. In a device of the class set forth, the combination of a cabinet open at one side, the upper portion of the one edge of the latter side having letters thereon, a combined index and holder slidingly mounted in one end of the cabinet and having a portion movable over the said letters, and a plurality of carriers movably connected at their lower ends within the lower portion of the cabinet and gradually increasing in length from the front toward the rear one.

3. In a device of the class set forth, the combination of a cabinet open at one side, a plurality of carriers pivotally mounted therein to move outward and inward through the said open side, the one edge portion of the latter side having a series of letters thereon, the upper end of each carrier, except the one in front, when in superior position, extending above that immediately in advance of it, and a combined index and holder movably mounted in the end of the cabinet adjacent to the said letters.

4. In a device of the class set forth, the combination of a cabinet, a series of carriers, a carrier-holder, and means for supporting said holder in operative position; said carriers being so pivoted in the cabinet as to be inclined when supported by said holder, the upper end of each carrier, except the one in front, when in superior position extending above that immediately in advance of it, and said carrier-holder being movable vertically and adapted to coöperate with the extended ends of the carriers.

5. In a device of the class set forth, the combination of a cabinet open in front, a series of carriers inclined forward and movably attached at their lower ends within the lower portion of the cabinet, the upper end of each carrier, except the one in front, when in superior position extending above that immediately in advance of it, a holder adapted to move over the upper ends of the carriers to liberate any desired carrier or group of carriers and to support the carriers when the cabinet is closed and an index for the carriers.

In testimony that I claim the foregoing as my own I have hereto affixed my signature in the presence of two witnesses.

RICHARDSON WILLIAM DICKENSON.

Witnesses:
ALICE B. MULLER,
WM. W. DANIELS.